C. E. BRIDGES.
WHEEL LOCK.
APPLICATION FILED MAR. 11, 1912.
1,046,549.
Patented Dec. 10, 1912.
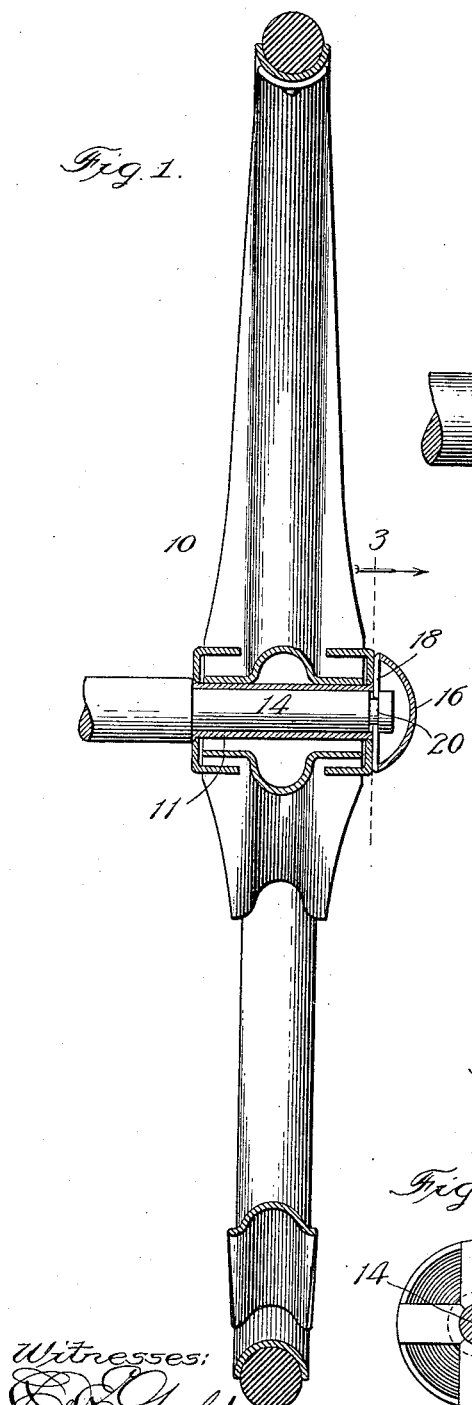
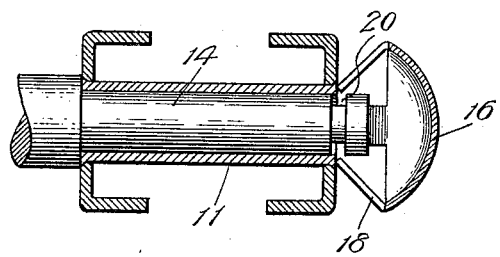
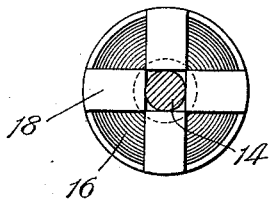
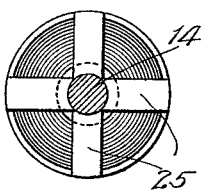
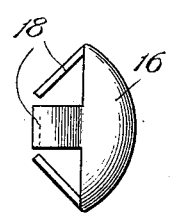
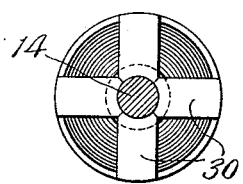
Inventor:
Charles E. Bridges,
By C. Clarence Poole
Atty

UNITED STATES PATENT OFFICE.

CHARLES E. BRIDGES, OF CHICAGO, ILLINOIS, ASSIGNOR TO BURGESS-NORTON COMPANY, OF GENEVA, ILLINOIS, A CORPORATION OF ILLINOIS.

WHEEL-LOCK.

1,046,549.   Specification of Letters Patent.   Patented Dec. 10, 1912.

Application filed March 11, 1912. Serial No. 683,139.

*To all whom it may concern:*

Be it known that I, CHARLES E. BRIDGES, a citizen of the United States, and a resident of Chicago, in the county of Cook and State of Illinois, have invented certain new and useful Improvements in Wheel-Locks; and I do hereby declare that the following is a full, clear, and exact description thereof, reference being had to the accompanying drawings, and to the letters of reference marked thereon, which form a part of this specification.

This invention relates to wheel-locks or means for securing wheels on the ends of their axles or spindles, such means being more especially designed for securing in place wheels on small vehicles and light machinery of various sorts, as for example, baby carriage wheels and wheels of children's go-carts, and the like.

The invention relates more particularly to the combination with a wheel and an axle spindle of a wheel-lock, consisting of a single piece of metal designed to be secured to or engaged with such spindle near its end, in a manner to retain the wheel thereon, and to be applied to the axle by merely bending parts of such piece of metal, as hereinafter more fully described and illustrated in the accompanying drawings.

In said drawings—Figure 1 is an axial section through a wheel of the kind described and claimed in my co-pending application Serial Number 683,140, filed March 11, 1912, showing the same in place upon the end of an axle spindle and my improved wheel-lock in engagement with such axle spindle to retain the wheel in place. Fig. 2 is a similar section through the hub portion of such wheel, showing the wheel-lock disengaged from the axle spindle but in position for engagement therewith. Fig. 3 is a radial section on the line 3—3 of Fig. 1, looking in the direction indicated by the arrow. Fig. 4 is a view in side elevation showing the complete wheel-lock detached from the axle spindle. Fig. 5 is a view similar to Fig. 3, but showing a modified form of the wheel-lock. Fig. 6 is a view similar to Fig. 3, but showing another modified form of construction.

As shown in said drawings, in Figs. 1 to 4, inclusive, 10 indicates a complete wheel, comprising a rim and spokes and a hub 11, which latter may be of practically any preferred form, but is here shown as tubular and of the particular construction illustrated in my copending application above-mentioned. The hub is rotatively mounted upon an axle spindle 14, although for the purpose of employing the improved wheel-lock here shown, it is not necessary that the wheel be rotatively mounted on the axle spindle; the wheel-lock being equally suited for securing in place a wheel which is non-rotative on its axle. The purpose of the wheel-lock herein shown is merely to keep the wheel from sliding off the end of the axle, and the same is not adapted to prevent relative rotation between such parts. The improved wheel-lock here shown comprises a circular cup-shaped member or cap 16, having integral, peripheral extensions or arms 18, 18. The cap 16 is shown as made of rounded or dome-shape, but the special form thereof is not material, provided it be recessed on its inner face to receive the outer end of the axle, over which it is placed. The arms 18, 18, when the device is in readiness for application to the axle, are bent toward each other through an angle of approximately 45°. Said arms are of such length that when bent toward each other at an angle, as stated, their ends will be located at a distance apart approximately equal to the full diameter of the axle spindle. In the portion of such spindle which extends beyond the hub of the wheel, when the latter is in place, is formed an annular groove 20, and it is designed that when the wheel has been placed upon its spindle the lock 16 may be placed in a position with the arms 18 surrounding the spindle and with their inner ends in substantially the plane of the groove 20, such ends then being in engagement with the face of the hub 11, as shown in Fig. 2. The cap being in such position, a hammer blow upon its outer face or other suitable pressure applied upon it, will force the body of the same toward the wheel with the effect of bending the arms 18 farther toward each other, whereby they will enter the groove 20 and will all lie in the same plane with each other and in substantially the plane of such groove, as shown in Fig. 1. The arms are preferably made of such length that when in the position described, they will enter the groove a sufficient distance to extend entirely to the bottom of the same, whereby the wheel-lock will fit tightly in place without any looseness of the parts. It is evident that when the wheel-lock is so placed in position upon an axle spindle the end of the hub will bear against each arm 18 throughout that part of its length which extends beyond the groove 20, and that any force tending to pull the wheel from the axle would exert a shearing force tending to shear off the inner ends of such arms between the end of the hub and the top of the groove, whereby it will be seen that a very great force would be required to pull the wheel off in such manner, and that the wheel-lock is therefore capable of withstanding a great amount of side thrust of the wheel hub against it. On the other hand if it is desired to remove the wheel-lock, this may be done by inserting a screw driver or similar implement under the edge of the dome-shaped top 16, between two of the arms 18, and prying it off, which action will result in bending the arms at their outer ends only whereby they may be easily pulled from the groove 20 and removed from the axle to free the wheel.

The form of device illustrated in Fig. 5 is similar in all respects to that above described except that in the end of each arm 25 is cut a curved notch, of the same, or substantially the same radius as the bottom of the groove 20 whereby such arms may extend farther into the groove and more or less completely encircle that portion of the shaft which lies at the bottom of the groove.

The form of device illustrated in Fig. 6 is also similar in all respects to that illustrated in Figs. 1 to 4, inclusive, except that each of the arms 30 of such modified form is made with its corners cut off diagonally, and in the end of such arm is cut an arc-shaped notch in the same manner as in the device shown in Fig. 5. It will be seen, therefore, that the arms may be made wider than those shown in Fig. 5 without overlapping at their ends, and that they may also extend to the bottom of the groove 20 throughout the entire circumference of such groove.

I claim as my invention:

1. The combination with an axle spindle provided with an annular groove near its end, and a wheel on said axle spindle, of a wheel-lock comprising a metal cap, the concave face of which is directed inwardly and is adapted to receive the end of the axle spindle, said cap being provided with integral marginal arms directed toward the axle and engaging said groove at their ends.

2. The combination with an axle spindle provided with an annular groove near its end, and a wheel on said axle spindle, of a wheel-lock comprising a metal cap provided with integral, marginal arms directed toward the axle and engaged at their ends with said groove, said arms being located in a plane perpendicular to the axle.

3. A wheel-lock consisting of a sheet metal cap provided with a plurality of integral, straight arms; said arms being of such length that, when bent into the same plane, their ends will approximately meet each other.

In testimony that I claim the foregoing as my invention I affix my signature in the presence of two witnesses, this 5th day of March A. D. 1912.

CHARLES E. BRIDGES.

Witnesses:
 EUGENE C. WAUN,
 GEORGE R. WILKINS.

Copies of this patent may be obtained for five cents each, by addressing the "Commissioner of Patents, Washington, D. C."